US006258866B1

(12) United States Patent
Kohoutek

(10) Patent No.: US 6,258,866 B1
(45) Date of Patent: Jul. 10, 2001

(54) BLOWING AGENT COMPATABILIZATION

(75) Inventor: Frank C. Kohoutek, Austin, TX (US)

(73) Assignee: Huntsman Petrochemical Corporation, Austin, TX (US)

(*) Notice: Subject to any disclaimer, the term of this patent is extended or adjusted under 35 U.S.C. 154(b) by 0 days.

(21) Appl. No.: 09/494,365

(22) Filed: Jan. 31, 2000

Related U.S. Application Data

(60) Provisional application No. 60/118,583, filed on Feb. 3, 1999.

(51) Int. Cl.[7] ..................................................... C08G 18/14
(52) U.S. Cl. ..................... 521/112; 521/114; 521/116; 521/117; 521/122; 521/128; 521/130; 521/131; 521/155; 521/170; 528/75; 528/76; 528/85; 252/182.23; 252/182.28; 252/182.29; 252/182.31; 252/183.12
(58) Field of Search ..................................... 521/112, 114, 521/116, 117, 122, 130, 128, 131, 155, 170; 528/75, 76, 85; 252/182.23, 182.28, 182.29, 182.31, 183.12

(56) References Cited

U.S. PATENT DOCUMENTS

| 4,529,744 | 7/1985 | Wood | 521/131 |
|---|---|---|---|
| 5,464,562 | 11/1995 | Patterson | 252/182.28 |
| 5,470,501 | 11/1995 | Fishback et al. | 252/182.28 |
| 5,635,554 | * 6/1997 | Boeckh et al. | 524/366 |
| 5,691,392 | * 11/1997 | Okoroafer et al. | 521/112 |
| 5,922,779 | 7/1999 | Hickey | 521/114 |

* cited by examiner

Primary Examiner—John M. Cooney, Jr.
(74) Attorney, Agent, or Firm—Russell R. Stolle; Ron D. Brown; Christopher J. Whewell

(57) ABSTRACT

Provided herein are subcombinations from which polyurethane foams and polyurethane foams containing polyisocyanurates may be prepared. The subcombinations are unique in that they contain components which synergistically act towards promoting compatibility between a blowing agent and the remaining components of the formulation. Through the use of the teachings herein, blowing agent concentrations in excess of 25% by weight of the total subcombination may be incorporated.

30 Claims, No Drawings

BLOWING AGENT COMPATABILIZATION

This Application claims the benfits of U.S. Provisional Application No. 60/118,583 filed Feb. 3, 1999.

BACKGROUND

1) Technical Field

The present invention relates generally to the field of polymeric foam production, and more particularly to polymeric foams made from the combination of two subcombinations generally referred to as an "A" portion and a "B" portion, wherein the B portion includes a polyol and the A portion contains an isocyanate.

2) Background Information

Various foamed materials may be produced using polymeric materials derived from a wide variety of materials and mixtures of materials, including polyolefins, styrenes, polyurethanes, and virtually any other base material originally in the solid state which cures to form a solid and substantially elastic mass having air pockets, cavities, or voids located throughout its bulk which were induced by the expansion of a gas within the bulk during the change of the material from the liquid to the solid state, this phase change being commonly referred to as the "curing" of the base material.

In the prior art, various methods have been devised using a wide range of materials for producing foamed materials from polymeric materials. Within the general class of foamed materials are included those familiar to those skilled in the art as polyurethanes and polyisocyanurates. Generally speaking, these materials are formed by a combination of two subcombinations of materials, commonly referred to by those of ordinary skill in the art as an "A" portion and a "B" portion.

Typically, the B portion of a subcombination from which a polyurethane may be formed contains a polyol component containing a plurality of hydroxyl groups in each molecule which are capable of reacting with the isocyanate groups present in a selected organic isocyanate (contained in the A portion) when the A and B portions are combined to form a polyurethane. The B portion typically contains ingredients additional to the polyol such as catalysts for promoting the reaction between the polyol and isocyanate; surfactants which enhance the interactions of the finished product with a substrate to which it is to be applied and assist in promoting homogeneity between the various components in the A portion; fire retardants; adhesion promoters; pigments; etc. It is generally preferred that the various components of the B portion are blended together to form a homogeneous mixture to which the A part of the formulation may be subsequently added. Under such an arrangement, the B portion may be made up en masse and stored for later admixture with the A portion at a desired time.

The A portion of the formulation typically consists only of the isocyanate used. When the B portion is combined with the A portion, a reaction between the polyol with the isocyanate occurs, and a polyurethane is formed. An isocyanurate is formed when an isocyanate molecule reacts with other isocyanate molecules to form a ring structure comprising three isocyanate molecules. A common scenario known to occur by those skilled in this art is where the polyol and isocyanate molecules react first with one another to form a polyurethane, with the liberation of heat. The heat thus liberated in situ is absorbed by other molecules within the reaction mixture, and especially other molecules of isocyanates. Isocyanate molecules which have absorbed sufficient thermal energy may then go on to react with one another to form polyisocyanurates within the polyurethane. Catalysts which promote the formation of polyisocyanurates are known to those skilled in this art, and generally comprise potassium salts of carboxylic acids having fewer than 12 carbon atoms per molecule, and quaternary ammonium salts.

Typically, a blowing agent is mixed in with at least one of either the A and B portions before or immediately after the mixing of the A and B portions with one another, under conditions sufficient to ensure that the blowing agent is capable of expanding during the curing process (either by the application of heat from the surroundings, or by liberation of heat from a chemical reaction occurring as a result of the curing of the polymeric material, or as a result of subjecting the whole mixture to a pressure change) so as to cause gaseous pockets to form within the whole mass of curable material during its cure, to produce a finished foam material. The curable material may be either a thermoset or thermoplastic.

The type and number of chemical materials useful as blowing agents in the prior art is large, and many may be used successfully according to the teachings herein. Suitable candidate materials for use as blowing agents include those capable of rapidly undergoing expansion, and which are inert with respect to the other components of the curable mixture. Historically, conventional blowing agents have been selected from the groups of compounds including hydrocarbons, halogenated hydrocarbons (including without limitation chlorinated hydrocarbons and chlorofluorocarbons), nitrogen, and carbon dioxide. However, in view of recent proclamations by various National and Regional governments, governmental agencies and non-governmental organizations, the use of halogenated materials, and especially halogenated hydrocarbons, as blowing agents has met great disfavor. Accordingly, the most preferable blowing agents for producing foamed materials are hydrocarbons, with two of the most preferable blowing agents being cyclopentane and isopentane. However, these blowing agents are not soluble in the polyol sub-portion of the polyurethane formulation, and hence must be incorporated into the final product using high degrees of mechanical mixing to form emulsions which are generally not stable and which tend to produce gas pockets in finished foam products having a broad polydispersity with respect to their size dimension. To date, attempts at producing single-phase mixtures containing polyols for polyurethane production which contain blowing agent as soluble components have met only limited success. An example of one such attempt is contained in the teachings of U.S. Pat. No. 5,578,652, the entire contents of which are incorporated by reference thereto. The dicyclopentadiene used therein is an especially hazardous material to work with.

SUMMARY OF THE INVENTION

The present invention comprises a mixture from which a polyurethane or a polyurethane which contains polyisocyanurates may be produced which comprises a polyol (that is preferably an aromatic polyester polyol), a blowing agent, an alkylphenol alkoxylate (preferably a nonylphenol ethoxylate), and an amine alkoxylate (preferably tallowamine ethoxylate). The alkylphenol ethoxylate and the amine ethoxylate are present in amounts sufficient to render the blowing agent miscible with the mixture the remaining components of the B portion, so as to render the mixture homogeneous. That is, the resulting mixture is a true solution of the blowing agent in the mixture, and is completely compatabilized.

DETAILED DESCRIPTION OF THE INVENTION

The present invention provides novel compositions of matter which are prepared by making physical mixtures of various components. Through use of the teachings herein, blowing agents which have been heretofore insoluble in a subcombination from which polyurethane foam (and polyurethane foam containing a polyisocyanurate) may be produced have been rendered miscible therein. In the prior art, the degree of solubility of a hydrocarbon blowing agent in a part B of a polyurethane formulation is on the order of less than 3%. Through the use of the instant teachings, blowing agent compatibility rates of about 15% with the B portion of the polyurethane formulation can be routinely achieved, and compatabilities on the order of 25% are achievable.

The present invention uses a synergistic combination of tallow amine ethoxylate with a nonylphenol ethoxylate, to render the hydrocarbon blowing agent miscible in the B portion of the polyurethane formulation. Neither the nonylphenol ethoxylate nor the tallow amine ethoxylate alone, at any level of concentration, are capable of producing this most unexpected result. The presence of both of these two materials in the formulation displays a synergy which renders the blowing agent compatible with the remaining components, and is responsible for the discovered effect disclosed herein. It is believed, however, that other alkoxylates of long-chain amines in combination with alkylated phenol alkoxylates other than nonylphenol ethoxylates are likely of being capable of functioning in similar synergistic regard when combined together as taught herein. It is further believed that the identification of other species suitable therefor, and determination of the effective relative amounts of each component required to be present to exhibit the effect shall fall well within the skill level of one of ordinary skill after reading and understanding of this specification and the appended claims. It is anticipated that by varying the hydrocarbon chain lengths of each molecular species required for the synergy (long-chain amine alkoxylate and alkylphenol alkoxylate) that the effect may be readily optimized or otherwise custom-tailored by anyone of ordinary skill in this art for a particular use. Accordingly, the disclosure of the particular species used herein is to be construed as exemplary of, and not delimitive of, the spirit of this invention.

Tallow amines are well-known to those of ordinary skill in the chemical arts and especially those of ordinary skill in chemistry derived from the slaughterhouse industry, i.e., saponification, soap-making, tallow rendering, etc. Tallow amines may be derived from reductive amination of the mixture of carboxylic acids which are provided by the hydrolysis of animal fats, such as oleo stock. As is well known, animal fats, including oleo stock, are glyceryl trimesters in which the acid portions are of varying chain lengths. Hydrolysis of such esters yields glycerin and the corresponding carboxylic acids, saturated or unsaturated, branched, or straight chain, as is well known to those of ordinary skill in the slaughterhouse chemical arts. A mixture of amines may be produced from reductive amination of the mixture of carboxylic acids produced from the hydrolysis of tallow. Amination of such a mixture of acids results in a mixture of amines of varied chain lengths called "tallow amine". Tallow amines are suitable for use in a variety of applications, and are especially preferred owing to their availability and their low cost. In addition, they may be readily alkoxylated, as described below, to alter or enhance their physical properties.

Alkoxylation is a process by which a plurality of alkoxy groups may be introduced into the molecular structure of an organic compound. Suitable candidate organic compounds for alkoxylation reactions include amines, alcohols, and phenols, in addition to others known to those skilled in the chemical arts. In the case alkoxylation of amines, an amine product, such as tallow amine, may be charged into a reactor into which an alkylene oxide (e.g., a gaseous alkylene oxide such as ethylene oxide) is subsequently introduced, preferably under pressure in the presence of a catalyst selected from the group I metal cations, with potassium being preferable. If the reactor temperature is raised to about 100 degrees centigrade and the pressure of alkylene oxide, say ethylene oxide, is increased to about 50 p.s.i., then a hydrogen atom of the amine is displaced by an alkoxy group. In the case where only one ethoxy group attaches to the nitrogen atom, the result is the replacement of a primary hydrogen atom on the nitrogen with an ethoxy group. However, more than one alkoxy group typically becomes incorporated into the molecule, and the chain of alkoxy units may comprise several $(-O-CH_2-CH_2)_n$ units attached in series to form a linear chain. In the case of a primary amine having two active hydrogens ($R-NH_2$), alkoxy chains may be attached by this process to either one or both sites of the active hydrogens. The resulting product(s) are generally referred to as "tallow amine alkoxylates". In the case when ethylene oxide is used as an alkylating agent, the products are referred to as "tallow amine ethoxylates". A nine mole ethoxylate of tallow amine would have nine moles (on an average, since the displacement is statistically-controlled and a distribution of products is obtained, much as in the same way as, in illustrative fashion, the halogenation of alkanes produces a mixture) of ethylene oxide incorporated into each mole of amine present. For purposes of this invention, the alkyl group of the starting amine from which the alkoxylates are prepared may comprise between 1 and 25 carbon atoms, either straight-chain or branched, saturated or unsaturated. The alkoxy groups introduced into the molecule may be derived from any alkylene oxide having any integral number between 2 and 20 (and including 2 and 20) carbon atoms per molecule of alkylene oxide, and there may be any integral number between 1 and 20 (and including 1 and 20) of such alkoxy groups incorporated onto a single site available for alkoxylation.

Similarly, phenols (including those which are alkyl-substituted at various locations of the benzene ring) may be alkoxylated, using reaction conditions and catalysts as set forth above for amines. In such fashion, phenol which has been substituted in the para position with say, a nonyl group, may be ethoxylated to produce a nine-mole ethoxylate of nonyl phenol. The resulting product would appear:

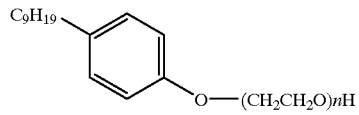

wherein n=9, and the nonyl group in the para position could be ortho or meta as well. Generally speaking, the alkyl group on the phenol (in this case the nonyl group) could be any hydrocarbon group, saturated or unsaturated, straight-chain or branched, having any integral number of carbon atoms between 1 and 20, including 1 and 20. The location on the benzene ring of any such hydrocarbyl group could be either ortho, para, or meta with respect to the phenolic oxygen atom. In addition, a plurality of alkyl groups may be present, each independently containing any integral number between 1 and 20 carbon atoms each (including 1 and 20), straight-chain or branched, saturated or unsaturated, in any combination of possible ortho, meta, and para position combinations. The alkoxy groups introduced into the molecule may be derived from any alkylene oxide having any integral number between 2 and 20 (including 2 and 20) carbon atoms per molecule of alkylene oxide, and there may be any integral number between 1 and 20 (including 1 and 20) of such alkoxy groups incorporated onto a single site available for alkoxylation. The value of n in the structure above can be any integral number between 1 and 25 (including 1 and 25) for purposes of this invention.

In formulations A, B, and C, set forth in table I below, all components were identical, except for the Surfonic® products used, which in example A (CO-15) was a 15 mole ethoxylate of castor oil, in B (T-5) was the 5 mole ethoxylate of tallow amine, and in C (DDA-3) was the 3 mole ethoxylate of decyl alcohol. In the tables herein, various

TABLE I formulations containing various ethoxylates, for which no compatibility was a observed between the blowing agent and the other components of the formulation.

|  | A | B | C |
|---|---|---|---|
| Terate 2031 | 85.0 | 85.0 | 85.0 |
| DE-62 | 10.0 | 10.0 | 10.0 |
| V-504 | 4.0 | 4.0 | 4.0 |
| 9540A | 2.5 | 2.5 | 2.5 |
| Cyclopentane | 18.6 | 18.6 | 18.6 |
| Isopentane | 8.0 | 8.0 | 8.0 |
| Surfonic ®CO-15 | 15.0 | — | — |
| Surfonic ®T-5 | — | 15.0 | — |
| Surfonic ®DDA-3 | — | — | 15.0 | components of the formulations are listed, as now set forth. The TERATE® 2031 component is a polyester polyol that is commercially available from Hoechst Celanese Company of Wilmington, S.C. The DE-62 component is a pentabromodylphenol oxide blend available from Great Lakes Chemical Company of West Lafayette, Ind. The V-504 product is a polyol that is commercially available from the Dow chemical Company of Midland, Mich. The 9540A product is potassium octoate available from Pelron of Lyons, Ill. SURFONIC® CO-15 is a castor oil ethoxylate available from Huntsman Petrochemical Corporation of 7114 North Lamar Boulevard, Austin, Tex. 78752. SURFONIC® T-5 is a tallow amine ethoxylate available from Huntsman Petrochemical Corporation of 7114 North Lamar Boulevard, Austin, Tex. 78752. SURFONIC® DDA-3 is a decyl alcohol ethoxylate available from Huntsman Petrochemical Corporation of 7114 North Lamar Boulevard, Austin, Tex. 78752. SURFONIC® N-120 is a 12 mole ethoxylate of nonylphenol available from Huntsman Petrochemical Corporation of 7114 North Lamar Boulevard, Austin, Tex. 78752. SURFONIC® N-95 is a 9.5 mole ethoxylate of nonylphenol available from Huntsman Petrochemical Corporation of 7114 North Lamar Boulevard, Austin, Tex. 78752. JEFFCAT®ZR-50 is a tertiary amine catalyst available from Huntsman Petrochemical Corporation of 7114 North Lamar Boulevard, Austin, Tex. 78752. JEFFCAT® TR-52 is a urethane catalyst available from Huntsman Petrochemical Corporation of 7114 North Lamar Boulevard, Austin, Tex. 78752.

In examples A, B, and C, none of the formulations exhibited compatibility between the blowing agent(s) and the remaining components of the formulation, thus demonstrating that the ethoxylates alone are ineffective alone for compatibilizing the mixture.

In table II below are examples of further formulations. As shown by example D, a higher level of tallow amino ethoxylate alone was also ineffective towards compatibilizing the mixture. Again, this ethoxylate, even at a 3 times the concentration employed in table I above was ineffective in promoting compatabilization, and resulted in the formation of an emulsion. Example E shows also that the use of the 12 mole ethoxylate of nonyl phenol is ineffective alone at relatively high concentration at providing compatibility between the components of the mixture.

TABLE II formulations containing ethoxylates of nonylphenol and of tallow amine, alone and in combination. Formulations D and E showed no compatibility between the blowing agent and the remaining components of the formulation. Formulations F and G were completely compatible. Formulation G is the most preferred embodiment of the invention.

|  | D | E | F | G |
|---|---|---|---|---|
| Terate 2031 | 85.0 | 85.0 | 85.0 | 85.0 |
| DE-62 | 10.0 | 10.0 | 10.0 | 10.0 |
| V-504 | 4.0 | 4.0 | 4.0 | 4.0 |
| 9540A | 2.5 | 2.5 | 2.5 | 2.5 |
| Cyclopentane | 18.6 | 18.6 | 18.6 | 18.6 |
| Isopentane | 8.0 | 8.0 | 8.0 | 8.0 |
| Surfonic ®T-5 | 45.0 | — | 15.0 | 20.0 |
| Surfonic ®N-120 | — | 45.0 | 20.0 | 25.0 |
| Surfonic ®N-95 | — | — | 10.0 | — |
| Jeffcat ®ZR-50 | 0.34 | 0.34 | 0.34 | 0.34 |
| Jeffcat ®TR-52 | 0.6 | 0.6 | 0.6 | 0.6 |

However, as examples F shows, the use of SURFONIC® T-5 together with SURFONIC® N-120 and SURFONIC® N-95 in the amounts indicated provides a mixture of total compatibility between the blowing agent and the remaining components of the mixture.

Further demonstration of the synergy of this invention is illustrated in example G, in which SURFONIC® T-5 is used together with SURFONIC® N-120 to provide a mixture having complete compatibility between the blowing agent and the remaining components! It is noteworthy that formulations containing either of these components alone, even at relatively high levels, (examples D and E) were ineffective in providing this compatabilization.

Consideration must be given to the fact that although this invention has been shown and described with respect to certain preferred embodiments, it is obvious that equivalent alterations and modifications will occur to others skilled in the art upon the reading and understanding of this specification and the claims appended hereto. The present invention includes all such equivalent alterations and modifications, and is limited only by the scope of the claims which follow.

I claim:

1. A mixture from which a polyurethane may be produced which comprises:
   i) a polyol;
   ii) a blowing agent;
   iii) an alkylphenol alkoxylate; and
   iv) an amine alkoxylate, wherein the alkylphenol alkoxylate and the amine alkoxylate are present in amounts sufficient to render the blowing agent miscible with the mixture.

2. A mixture according to claim 1 wherein said amine alkoxylate and said alkylphenol alkoxylate are present in amounts effective to render said blowing agent soluble in said mixture.

3. A mixture according to claim 1 wherein the alkylphenol alkoxylate is one of the general formula:

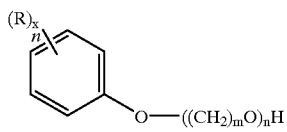

in which m is independently any integer between 1 and 20 (including 1 and 20), n is independently any integer between 1 and 25 (including 1 and 25), and in which R is at least one alkyl group having independently any integral number of carbon atoms between 1 and 20 (including 1 and 20), straight-chain or branched, saturated or unsaturated, and x is a whole integer having a value of 1, 2, or 3; or any salt or any ester thereof.

4. A mixture according to claim 1 in which said amine alkoxylate is of the formula:

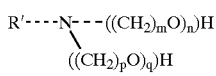

in which m is independently any integer between 1 and 25 (including 1 and 25), n is independently any integer between 1 and 20, (including 1 and 20), p is independently any integer between 1 and 25 (including 1 and 25), q is independently any integer between 1 and 20 (including 1 and 20), and in which R' is an alkyl group having between 1 and 30 carbon atoms (including 1 and 30), straight-chain, branched, or cyclic, saturated or unsaturated; or any salt or ester thereof.

5. A mixture according to claim 3 wherein said alkylphenol alkoxylate is nonylphenol ethoxylate having between 3 and 19 moles of ethylene oxide incorporated into each molecule.

6. A mixture according to claim 1 in which said amine alkoxylate is of the formula:

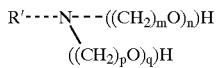

in which m is independently any integer between 1 and 25 (including 1 and 25), n is independently any integer between 1 and 20 (including 1 and 20), inclusive, p is independently any integer between 1 and 25 (including 1 and 25), q is independently any integer between 1 and 20 (including 1 and 20), inclusive, and in which R' is an alkyl group having between 1 and 30 (including 1 and 30) carbon atoms, straight-chain or branched, saturated or unsaturated; or any salt or ester thereof, and in which the alkylphenol alkoxylate is one of the general formula:

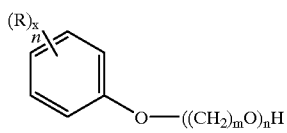

in which m is independently any whole number between 1 and 20 (including 1 and 20), n is independently any whole integer between 1 and 25 (including 1 and 25), and in which R is an alkyl group having between 1 and 20 carbon atoms (including 1 and 20), straight-chain, branched, or cyclic, saturated or unsaturated, and x is a whole integer having any value between 0 and 3 (including 0 and 3); or any salt or any ester thereof.

7. A mixture according to claim 6 wherein said amine ethoxylate is tallow amine ethoxylate containing between 1 and 20 moles of ethylene oxide incorporated into each molecule.

8. A mixture according to claim 1 wherein said polyol is a polyol mixture containing two or more polyols.

9. A mixture according to claim 1 wherein said polyol comprises a polyester polyol.

10. A mixture according to claim 9 wherein said polyester polyol is an aromatic polyester polyol derived from at least one of a material selected from the group consisting of: a polyethyleneterephthalate, a phthalic acid anhydride, or dimethylterephthalate.

11. A mixture according to claim 1 wherein said polyol is a polyether polyol.

12. A mixture according to claim 1 wherein said blowing agent comprises a hydrocarbon blowing agent.

13. A mixture according to claim 1 wherein said blowing agent comprises at least one blowing agent selected from the group consisting of alkanes, cycloalkanes, isoalkanes, neoalkanes and water.

14. A mixture according to claim 13 wherein said blowing agent comprises at least one compound selected from the group consisting of: butane, isobutane, n-pentane, isopentane, cyclohexane, methylcyclopentane, and n-hexane.

15. A mixture according to claim 3 wherein there are at least two R (alkyl) groups attached to the aromatic nucleus, in any positions, in which each are independently straight-chain or branched, saturated or unsaturated, and independently contain any number of carbon atoms between 1 and 20 per molecule.

16. A mixture according to claims 1 or 15 wherein the alkyl portion of said alkylphenol alkoxylate contains at least one group selected from the group consisting of: butyl, pentyl, hexyl, heptyl, octyl, nonyl, decyl, undecyl, dodecyl, or isomers thereof.

17. A mixture according to claim 6 in which each of said alkylphenol alkoxylate and said amine alkoxylate are present in amounts effective to render said blowing agent miscible in said mixture to the degree of at least 10% by weight of the total mixture.

18. A mixture according to claim 6 in which each of said alkylphenol alkoxylate and said amine alkoxylate are present in amounts effective to render said blowing agent miscible in said mixture to the degree of at least 15% by weight of the total mixture.

19. A mixture according to claim 6 in which each of said alkylphenol alkoxylate and said amine alkoxylate are present in amounts effective to render said blowing agent miscible in said mixture to the degree of at least 20% by weight of the total mixture.

20. A mixture according to claim 6 in which each of said alkylphenol alkoxylate and said amine alkoxylate are present in amounts effective to render said blowing agent miscible in said mixture to the degree of at least 25% by weight of the total mixture.

21. A polyurethane product made by combining a mixture according to claims 1 or 6 with an organic isocyanate compound.

22. A polyurethane product according to claim 21 wherein said isocyanate is at least one isocyanate selected from the group consisting of: 4,4'-diphenylmethane-di-isocyanate ("MDI"), toluene di-isocyanate ("TDI"), or polymeric derivatives of each of the foregoing.

23. A product according to claim 22 in which said product comprises a foam.

24. A product according to claim 23 wherein said foam comprises a polyisocyanurate.

25. A process for forming a polyurethane foam which comprises the steps of:
   i) providing a mixture according to claims 1 or 6; and
   ii) adding an organic isocyanate selected from the group consisting of: 4,4'-diphenylmethane-di-isocyanate ("MDI"), toluene di-isocyanate ("TDI"), or polymeric derivatives of each of the foregoing, to said mixture under conditions sufficient to permit expansion of said blowing agent, so as to provide a foamed product.

26. A process according to claim 25 wherein said foamed product includes a polyisocyanurate.

27. A process according to claim 25 wherein said foamed product is useful as insulation.

28. A process according to claim 25 wherein said foamed product is useful as a seal between two surfaces.

29. A process according to claim 25 wherein said foamed product is useful as a cushioning material.

30. A process according to claim 25 wherein said foamed product comprises a closed cell foam.

* * * * *